A. SKIBINSKI.
TOOL HOLDER.
APPLICATION FILED AUG. 30, 1919.
1,342,031.
Patented June 1, 1920.
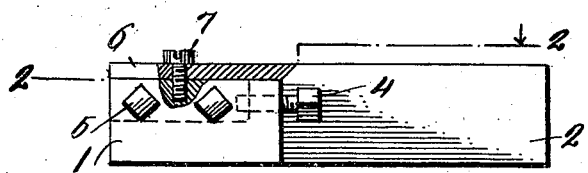
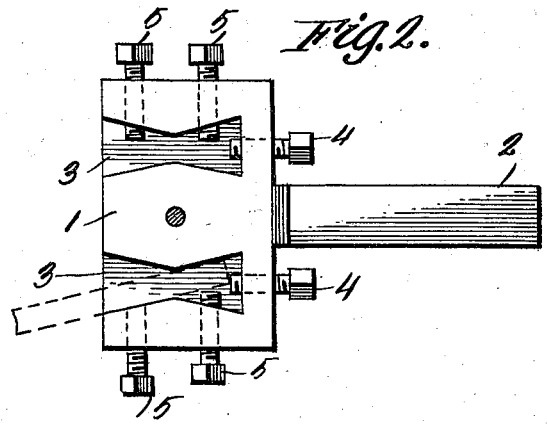
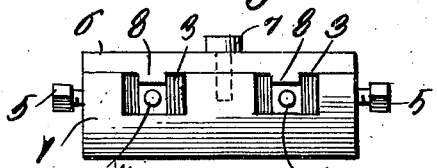
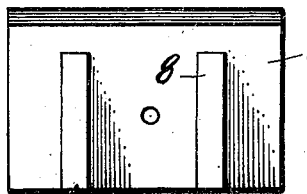
Inventor
ADAM SKIBINSKI
WITNESSES

UNITED STATES PATENT OFFICE.

ADAM SKIBINSKI, OF GREENFIELD, MASSACHUSETTS.

TOOL-HOLDER.

1,342,031.     Specification of Letters Patent.     Patented June 1, 1920.

Application filed August 30, 1919. Serial No. 320,756.

*To all whom it may concern:*

Be it known that I, ADAM SKIBINSKI, a citizen of the United States, residing at Greenfield, in the county of Franklin and State of Massachusetts, have invented certain new and useful Improvements in Tool-Holders, of which the following is a specification.

The invention relates to means for receiving and holding a cutting tool in the required adjusted position and aims to provide a device of this character which is capable of receiving a plurality of cutting tools and admitting of each being independently adjusted as may be required.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawings,

Figure 1 is a side view of a tool holder embodying the invention, portions being broken away.

Fig. 2 is a plan with the cap plate removed.

Fig. 3 is a front view.

Fig. 4 is a detail view of the cap plate as seen from the inner side.

Corresponding and like parts are referred to in the following description and indicated in the several views of the drawings by like reference characters.

The holder comprises a head 1 and shank 2. Recesses 3 are formed in one side of the head 1 to receive the cutting tools, as indicated by the dotted lines in Fig. 2. The recesses 3 are elongated and disposed in parallel relation and are made tapering from a middle point toward opposite ends. The side walls of the recesses 3 incline in opposite directions from a middle point, with the result that the recesses flare from a central point toward opposite ends, thereby providing for angular adjustment of the cutting tools placed therein. Each of the recesses 3 is provided with a rear set screw 4 and a pair of side set screws 5. The side set screws 5 are disposed equidistant upon opposite sides of the contracted portion of the recess, hence by proper manipulation of the set screws 5, the cutting tool may be adjusted to any required angular position within the range of its adjustment. The rear set screws 4 provide for holding the cutting tool projected to the required extent.

As hereinbefore stated, the recesses 3 are formed in a side of the head 1 and they are adapted to be closed by means of a cap plate 6, which is retained in place by means of a machine screw 7, or like fastening. Ribs 8 are provided upon the inner face of the cap plate 6 and are disposed centrally of the recesses, so as to engage the cutting tools and assist materially in preventing displacement thereof. The ribs 8 enable the cap plate to be adjusted so that outward displacement of the cutting tools is prevented by a clamping action of the ribs 8 thereagainst.

Having thus fully described my invention, what I claim as new and desire to secure by Letters Patent is:—

1. A tool holder, embodying a head provided with an elongated tool receiving recess which is contracted at a middle point and flares toward its opposite ends and set screws threaded into the head and projecting into the widened end portions of the recess to effect angular adjustment of the tool and to secure the same in the adjusted position.

2. A tool holder, comprising a head having an elongated tool receiving recess which flares toward opposite ends from a central point, a set screw at the rear end of the recess and other set screws at one side of the recess and entering the flared ends thereof.

3. A tool holder, comprising a head provided with a centrally disposed shank and having a pair of elongated tool receiving recesses in one side, said recesses flaring from a central point toward opposite ends, a cap plate for closing the open sides of the recesses and provided upon its inner face with tool clamping ribs and set screws at the rear ends and sides of the said tool receiving recesses.

In testimony whereof I affix my signature in presence of two witnesses.

ADAM SKIBINSKI.

Witnesses:
   GEO. L. MOWRY,
   ANTON YOBST.